Patented Mar. 13, 1923.

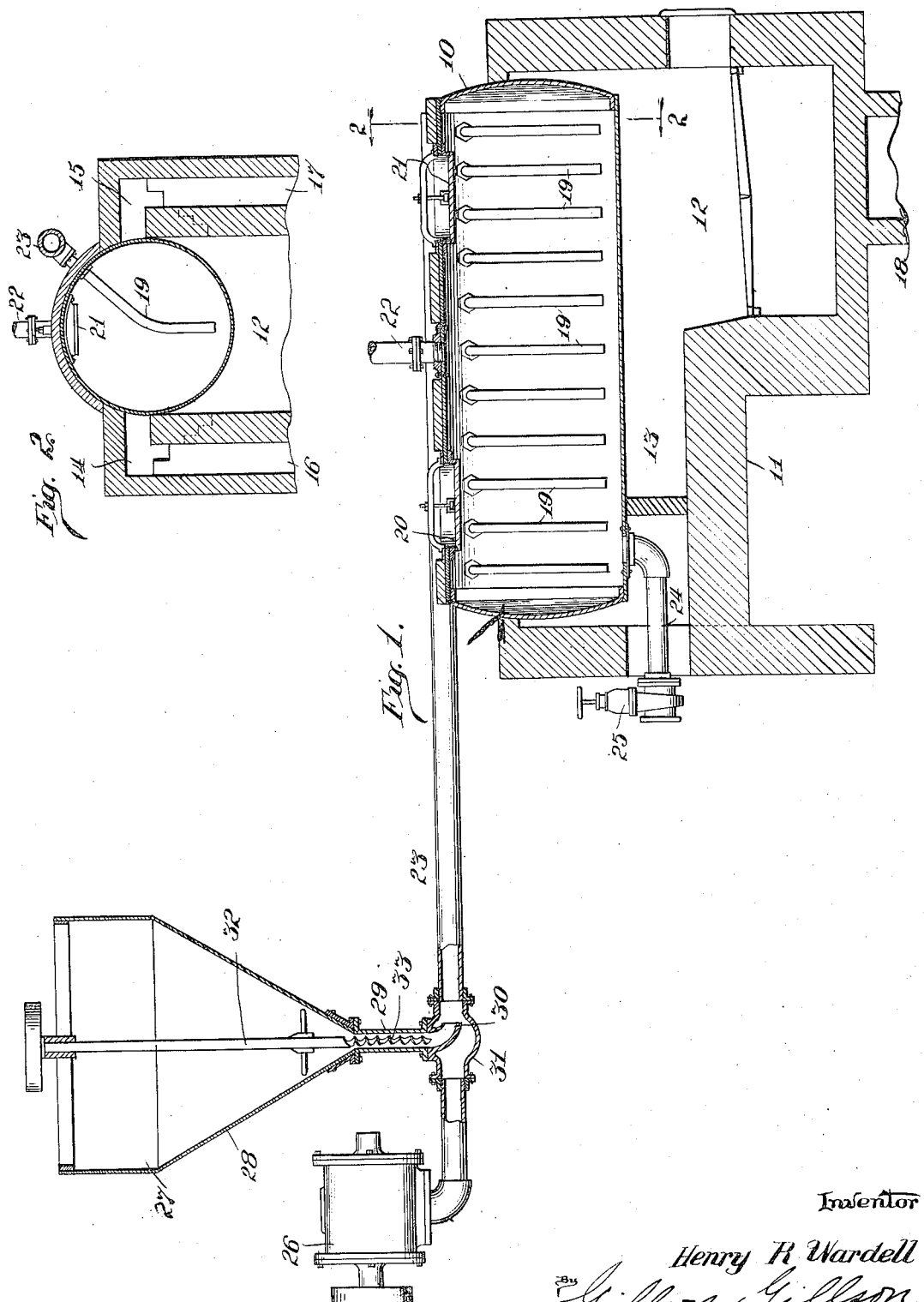

1,448,370

UNITED STATES PATENT OFFICE.

HENRY R. WARDELL, OF NEW YORK, N. Y., ASSIGNOR TO CENTRAL COMMERCIAL COMPANY, OF CHICAGO, ILLINOIS, A CORPORATION OF ILLINOIS.

APPARATUS FOR TREATMENT OF ASPHALT.

Application filed March 4, 1920. Serial No. 363,360. Renewed July 15, 1922. Serial No. 575,274.

*To all whom it may concern:*

Be it known that I, HENRY R. WARDELL, a citizen of the United States, and resident of New York, county of New York, and State of New York, have invented certain new and useful Improvements in Apparatus for Treatment of Asphalt, of which the following is a specification, and which are illustrated in the accompanying drawings, forming a part thereof.

The invention relates to apparatus for the treatment of asphalt and has for its object to provide an apparatus for producing an intimate admixture of dry pulverous material with asphalt. It is well known that the advantageous properties of certain natural asphalts are due to a proportion of finely divided earthy material in such intimate association with the bituminous constituents that its presence is only apparent from the quality of the mixture or by chemical analysis. Furthermore, while efforts have been made to produce asphaltic compounds having like properties with these natural asphalts it has not heretofore been possible to secure a sufficiently intimate admixture of finely divided earthy material with the asphaltic material to obtain the desired results. This has been in part due to the fact that when dry pulverous material is added to asphalt in the fluid state, small compact masses of the dry material become coated with the bituminous compounds and thereafter effectually resist all efforts to reduce them. The present invention contemplates the introduction of dry pulverous earthy material, especially powdered slate or slate dust, into asphalt in the fluid state, with an air blast which also serves to accomplish a thorough agitation of the mixed materials.

In the accompanying drawings:

Fig. 1 is a sectional view of the apparatus embodying the invention with some parts shown in elevation, and Fig. 2 is a detail section taken on the line 2—2 of Fig. 1.

The particular form of apparatus selected for illustration comprises a retort 10, preferably of horizontal cylindrical shape. As shown, this retort is mounted in a furnace setting 11, comprising a fire box 12, located under one end of the retort, a horizontal flue 13, extending under the retort to its opposite end, lead flues 14, 15 and vertical flues 16, 17, extending downwardly from the forward ends of the lead flues 14, 15, to a smoke tunnel 18.

A series of blast pipes 19 enter the retort at intervals on a longitudinal line extending along the upper part of the same, but preferably somewhat removed from the center to clear the man holes 20, 21, and vent pipe 22. As shown, these blast pipes reach nearly to the bottom of the retort and all of them communicate at their upper ends with a common blast manifold 23. The retort is also equipped with a discharge pipe 24 which extends through the walls of the setting 11 and is controlled by a valve 25 located outside of the setting. Air blast is supplied to the manifold 23 from a positive pressure blower conventionally represented at 26, and the dry pulverous material is supplied from a hopper 27. As shown, the lower end portion 28 of the hopper 27 is of conical shape and communicates with a vertical discharge tube 29, which enters the blast manifold 23 and is turned forwardly within the same to provide a discharge nozzle 30 which faces in the direction of the air blast. As shown, the adjacent parts of the blast manifold 23 are connected by a coupling 31, which receives the discharge tube 29 and is formed with an enlarged body which surrounds the nozzle 30. To insure a continuous feed of the dry pulverous material from the hopper 27 through the discharge tube 29 and nozzle 30, the hopper is centrally provided with a vertical stirrer shaft 32, the lower end of which extends into the discharge tube 29 and is formed into a feed screw 33.

In use, the retort 10 is charged with the asphaltic material, and this material is brought to a fluid state by heat supplied from the fire-box 12. A measured quantity of dry pulverous material, such as powdered slate or slate dust, is then placed in the hopper 27, the amount of this material constituting a selected portion of the weight of the charge of asphaltic material contained in the retort 10. Upon operation of the blower 26 and stirrer shaft 32 the slate is progressively discharged into the batch with the air blast, the movement of the air through the batch from the lower ends of the blast pipes 19 serving to violently agitate the mixed materials. If desired this agitation may be continued after the contents of the hopper 27 have been exhausted, and similarly the blower 26 may be operated prior to the delivery of slate dust at the discharge nozzle 30 for accomplishing a preliminary mixture of the asphaltic constituents of the batch or for modifying their character, as in the manufacture of blown oil asphalts.

A quantity of slate dust equal to 60% of the weight of the asphaltic constituents of the batch may be added without destroying the fluid character of the batch when heated while the addition of a quantity of slate dust equal to only 25% of the weight of the batch produces a desirable product for some purposes. Furthermore, the addition of the slate dust increases the weight of the batch without a corresponding increase in volume and renders it possible to use softer and more pliable asphalts for roofing and paving, thereby producing a product which is less liable to crack when cold without danger of its flowing under the sun in hot weather.

I claim as my invention:

1. Apparatus for treating asphalt comprising, in combination, a receptacle, means for introducing a blast of gas into a mass of liquid asphalt in the receptacle, means for feeding powdered material into said blast and means for initially melting the asphalt and subsequently maintaining it in the liquid state during the introduction of the blast.

2. Apparatus for treating asphalt comprising in combination, a receptacle for crude asphaltic material, means for heating the retort to bring the material to the fluid state, means for introducing a blast of gas bearing powdered material in suspension below the level of the liquid asphalt in the receptacle.

3. Apparatus for treating asphalt comprising, in combination, a receptacle for crude asphaltic material, a pipe entering said receptacle and extending to its lower portion, means for passing a blast of gas bearing powdered material through said pipe, and means independent of the blast for heating the asphalt while in the receptacle.

4. An apparatus for treating asphalt comprising a retort adapted to receive crude asphaltic material, means for heating the retort to bring the material to the fluid state, a blast pipe entering the retort and extending to its lower portion, a feed hopper for dry material, and a nozzle for the hopper entering the blast pipe.

5. Apparatus for treating asphalt comprising, in combination, a receptacle, means for introducing blasts of gas into a mass of asphalt in said receptacle at a plurality of points, means for feeding powdered material into said blasts, and means independent of the blasts for initially melting and subsequently maintaining the asphalt in the liquid state during the admission of the blast.

6. Apparatus for treating asphalt comprising, in combination, a receptacle, a blast having a plurality of branches entering the receptacle and adapted to discharge below the surface of the asphalt contained therein, means for forcing a blast of gas through said pipe, means for feeding dry pulverized material with said blast, and means independent of the blast for initially melting and subsequently maintaining said asphalt in the liquid state.

7. Apparatus for treating asphalt comprising, in combination, a retort, a blast pipe having a series of branches entering the upper portion of said resort and opening downward near the lower portion thereof, means for introducing a blast in said pipe, a hopper having a discharge nozzle projecting into the blast pipe, means in the hopper to feed powdered material through said nozzle, and means independent of the blast for heating the retort.

8. Apparatus for treating asphalt comprising, in combination, a furnace setting, a horizontal retort mounted in said setting, a blast pipe having a row of branches arranged longitudinally of the retort, each branch entering the receptacle and adapted to discharge below the level of the asphalt contained therein, means for forcing a blast of gas through said pipe and means for feeding dry pulverized material into said pipe.

9. An apparatus for treating asphalt comprising, in combination, a furnace setting, a retort mounted in said setting, a blast pipe entering the retort and extending to its lower portion, and a feed hopper for dry material opening into the blast pipe.

HENRY R. WARDELL.